United States Patent
Hodgkinson et al.

(10) Patent No.: US 6,726,761 B2
(45) Date of Patent: Apr. 27, 2004

(54) BLACK HIGH TEMPERATURE EMISSIVITY PAINT

(75) Inventors: Elaine C. Hodgkinson, Derby (GB); Hugh M. L. Watson, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/354,043

(22) Filed: Jan. 30, 2003

(65) Prior Publication Data
US 2003/0187132 A1 Oct. 2, 2003

(30) Foreign Application Priority Data
Feb. 12, 2002 (GB) .............................. 0203214

(51) Int. Cl.$^7$ ................................................ C09D 1/00
(52) U.S. Cl. .................................. 106/287.14; 106/403
(58) Field of Search ............................. 106/298.14, 403

(56) References Cited

U.S. PATENT DOCUMENTS

| | | | |
|---|---|---|---|
| 5,008,136 A | | 4/1991 | Chamberlain |
| 5,348,914 A | * | 9/1994 | Thometzek et al. .......... 501/18 |
| 5,501,900 A | * | 3/1996 | Harada et al. ............... 428/323 |
| 5,688,051 A | | 11/1997 | King |
| 5,907,008 A | | 5/1999 | Nakano |
| 6,616,744 B1 | * | 9/2003 | Sainz et al. .................. 106/403 |

FOREIGN PATENT DOCUMENTS

| | | |
|---|---|---|
| EP | 1 291 395 A | 3/2003 |
| GB | 2 072 212 A | 9/1981 |
| GB | 2 328 213 A | 2/1999 |
| GB | 2348466 A | 10/2000 |
| JP | 57174647 A | 4/1981 |
| JP | 57174648 A | 4/1981 |
| JP | 04089873 AB | 3/1992 |

* cited by examiner

Primary Examiner—Margaret G. Moore
(74) Attorney, Agent, or Firm—W. Warren Taltavull; Manelli, Denison & Selter PLLC

(57) ABSTRACT

A black high temperature emissivity paint comprises 27.5 wt black pigment, 50.5% acrylic resin and 22 wt % silicone resin excluding solvent. The black pigment comprises (Co, Fe) (Fe,Cr)$_2$ O$_4$ and Ni. The black high temperature emissivity paint is applied to components of gas turbine engines and the gas turbine engine is run at the gas turbine engines normal operating conditions. The component coated with the black high temperature emissivity paint is viewed by an optical pyrometer and the optical pyrometer is used to determine the temperature of the component. The pyrometer measures the energy radiated by the component. The advantage of the black high temperature emissivity paint is that the colour, and hence the emissivity, remain unchanged at temperatures of 1100° C. and greater. This enables the pyrometer to be used without the need to recalibrate the pyrometer to take into account changes in emissivity of the black high temperature emissivity paint. It enables higher temperature use with more accuracy.

6 Claims, No Drawings

BLACK HIGH TEMPERATURE EMISSIVITY PAINT

The present invention relates to black high temperature emissivity paint.

Black high temperature emissivity paints are used in the development, or operation, of gas turbine engines. Black high temperature emissivity paints are applied to components of gas turbine engines and the gas turbine engine is run at the gas turbine engines normal operating conditions. The component coated with the black high temperature emissivity paint is viewed by an optical pyrometer and the optical pyrometer is used to determine the temperature of the component. The pyrometer measures the energy radiated by the component. The temperature is determined because the emissivity of the black high temperature emissivity paint is known.

Existing black high temperature emissivity paint changes colour at temperatures of 900° C. and greater and hence the emissivity of the black high temperature emissivity paint changes. Thus it may be necessary to recalibrate the pyrometer at different temperatures to take into account the change in colour, and emissivity, of the black high temperature emissivity paint at different temperatures.

There is a requirement for black high temperature emissivity paint whose colour remains unchanged at temperatures of 1100° C. and greater.

Accordingly the present invention seeks to provide a novel black high temperature emissivity paint whose colour remains unchanged at temperatures of 1100° C. and greater.

Accordingly the present invention provides a black high temperature emissivity paint comprising a black pigment, a binder and a solvent, the black pigment comprising $(Co,Fe)(Fe,Cr)_2 O_4$ and Ni.

Preferably the binder comprises acrylic resin and silicone resin.

Preferably the black high temperature emissivity paint comprises 25 wt % to 35 wt % black pigment, 40 wt % to 60 wt % acrylic resin and 20 wt % to 30 wt % silicone resin excluding solvent.

Preferably the black high temperature emissivity paint comprises 27.5 wt % black pigment, 50.5 wt % acrylic resin and 22 wt % silicone resin excluding solvent.

Preferably the solvent comprises a mixture of propylene glycol ethers.

Preferably the solvent comprises a mixture of 80% 1-methoxy-2-propanol and 20% dipropylene glycol monomethyl ether.

The present invention will be more fully described by way of example.

A black high temperature emissivity paint according to the present invention consists of a black pigment, a binder and a solvent, the black pigment consists of a mixed metal oxide and nickel in particular $(Co,Fe)(Fe,Cr)_2 O_4$ and Ni. The binder preferably consists of acrylic resin and silicone resin.

The solvent preferably comprises a mixture of propylene glycol ethers. Preferably the solvent comprises a mixture of 80% 1-methoxy-2-propanol and 20% dipropylene glycol monomethyl ether. The amount of solvent used depends upon the particular method of applying the paint.

Preferably the black high temperature emissivity paint consists of 25 wt % to 35 wt % black pigment, 40 wt % to 60 wt % acrylic resin and 20 wt % to 30 wt % silicone resin excluding solvent.

Preferably the black high temperature emissivity paint consists of 27.5 wt % black pigment, 50.5 wt % acrylic resin and 22 wt % silicone resin excluding solvent.

The black pigment has a CI Pigment Number Black 27 and is sold under the product code CT1701, Black, by Johnson Matthey, Ceramic Materials Division, Uttoxeter Road, Stokeon-Trent, Staffordshire, ST3 7XW, England.

The black high temperature emissivity paint is applied to a component of gas turbine engines, for example a turbine blade, a turbine vane, a combustion chamber etc, and the gas turbine engine is run at the gas turbine engines normal operating conditions. The component coated with the black high temperature emissivity paint is viewed by an optical pyrometer and the optical pyrometer is used to determine the temperature of the component. The pyrometer measures the energy radiated by the component. The temperature is determined because the emissivity of the black high temperature emissivity paint is known.

The advantage of the black high temperature emissivity paint is that the colour, and hence the emissivity, of the black high temperature emissivity paint, remain unchanged at temperature of 1100° C and greater. This enables the pyrometer to be used without the need to recalibrate the pyrometer to take into account changes in emissivity of the black high temperature emissivity paint. It also enables pyrometers to be used at higher temperatures with a greater degree of accuracy in the temperature measurements.

Although the present invention has been described with reference to the application of the black high temperature emissivity paint on gas turbine engine components, it is equally applicable to apply the black high temperature emissivity paint on components of other engines and other apparatus, which operate at high temperatures.

We claim:

1. A black high temperature emissivity paint comprising a black pigment, a binder and a solvent, the black pigment comprising $(Co,Fe)(Fe, Cr)_2 O_4$ and Ni.

2. A black high temperature emissivity paint as claimed in claim 1 wherein the binder comprises acrylic resin and silicone resin.

3. A black high temperature emissivity paint as claimed in claim 1 comprising 25 wt % to 35 wt % black pigment, 40 wt % to 60 wt % acrylic resin and 20 wt % to 30 wt % silicone resin excluding solvent.

4. A black high temperature emissivity paint as claimed in claim 3 comprising 27.5 wt % black pigment, 50.5 wt % acrylic resin and 22 wt % silicone resin excluding solvent.

5. A black high temperature emissivity paint as claimed in claim 1 wherein the solvent comprises a mixture of propylene glycol ethers.

6. A black high temperature emissivity paint as claimed in claim 5 wherein the solvent comprises a mixture of 80% 1-methoxy-2-propanol and 20% dipropylene glycol monomethyl ether.

* * * * *